3,018,215
Patented Jan. 23, 1962

3,018,215
THIOPHOSPHORIC ACID ESTER COMPOUNDS
Max Pianka, St. Albans, England, assignor to The Murphy Chemical Company Limited, St. Albans, England, a company of Great Britain
No Drawing. Filed Jan. 14, 1960, Ser. No. 2,354
Claims priority, application Great Britain Jan. 20, 1959
18 Claims. (Cl. 167—22)

This invention is concerned with improvements in or relating to pest control agents.

The invention provides new compounds of the general formula:

$$\begin{array}{c} RO \\ \diagdown \\ R^1O \end{array} \!\!\! P(=\!O) \!-\! S \!-\! Z \!-\! R^2$$

in which Z is a sulphur atom or an $-SO_2-$ group;
R and $R^1$ may be the same or different and each is an alkyl group containing 1–4 carbon atoms and
$R^2$ is one of the following groups:

(i) a substituted thiocarbamoyl group, viz, $$-\!\!\overset{S}{\underset{\|}{C}}\!-\!N\!\!\begin{array}{c} R^3 \\ \diagdown \\ R^4 \end{array}$$

in which $R^3$ is a hydrogen atom or an alkyl group and $R^4$ is an alkyl group;

(ii) an alkoxythiocarbonyl group (i.e.

$$-\!\!\overset{S}{\underset{\|}{C}}\!-\!OR^5$$

where $R^5$ is an alkyl group);

(iii) an alkyl group, which may be substituted;
(iv) an aryl or substituted aryl group, or
(v) a heterocyclic or substituted heterocyclic group.

The new compounds according to the invention have interesting pest control properties, in particular, high acaricidal activity; at the same time the new compounds possess a generally low mammalian toxicity. Some of the compounds also possesses aphicidal and fungicidal activity and this of course makes them particularly interesting as multi-action pest control agents.

The compounds according to general Formula I in which $R^2$ is a mono- or dialkyl thiocarbamoyl group are particularly important since members of these classes in addition to being potent acaricides also possess fungicidal activity of a high order against various common plant fungal pathogens e.g. *Venturia inaequalis*. The alkyl groups ($R_3$ and $R_4$) in these compounds may contain from 1–12 carbon atoms and preferably are methyl or ethyl groups.

Where the group $R^2$ is an unsubstituted alkyl group it may contain 1–12 carbon atoms and preferably contains 1–4 carbon atoms. However $R^2$ ($=$alkyl) may be substituted e.g. with aryl or heterocyclic substituents.

Thus R and $R^1$ may be a methyl, ethyl, n-propyl, isopropyl or butyl group.

$R^3$ may be hydrogen or a methyl, ethyl, n-propyl, isopropyl, n-butyl, tert-butyl, n-hexyl, cyclohexyl, n-nonyl or dodecyl group, and $R^4$ and $R^5$ may each be a methyl, ethyl, n-propyl, isopropyl, n-butyl, tert-butyl, n-hexyl, cyclohexyl, n-nonyl or dodecyl group.

Where $R^2$ is an unsubstituted alkyl group it may be methyl, ethyl, n-propyl, isopropyl, n-nonyl or dodecyl. $R^2$ may be an alkyl group in which a carbon-carbon bond is interrupted by a sulphur or an oxygen atom. $R^2$ may be substituted by a choloro atom or by any of the following groups: nitro, phenyl, substituted phenyl groups, including chlorophenyls and nitrophenyls, naphthyl, furyl, thiophene, alkylthio, etc.

Where $R^2$ is an aryl or substituted aryl group it may be phenyl or naphthyl or either of these groups substituted with one or more chloro, nitro, etc. groups.

Where $R^2$ is a heterocyclic or substituted heterocyclic it may be e.g. thiazoline, benzthiazole, etc.

Where the compounds according to the invention include basic groups in the molecule, it will be clear that acid addition salts of such compounds may be prepared and it is to be understood that such salts are intended to be within the scope of the invention. Such salts include the hydrochlorides and other salts containing inorganic acid residues as well as salts formed with organic residues such as hydrogen oxalates, etc.

Compounds according to the invention which are of particular interest having regard to their high acaricidal, insecticidal and fungicidal activity are:

(a)
$$(C_2H_5O)_2\overset{O}{\underset{\|}{P}}\!-\!S\!-\!S\!-\!\overset{S}{\underset{\|}{C}}\!-\!N(CH_3)_2$$

O,O-diethyl S-N,N-dimethyldithio-carbamoyl phosphorothiolate i.e. the reaction product of diethoxyoxophosphorane sulphenyl chloride and sodium N:N-dimethyldithiocarbamate, and (b)
$$(C_2H_5O)_2\overset{O}{\underset{\|}{P}}\!-\!S\!-\!S\!-\!\overset{S}{\underset{\|}{C}}\!-\!N(C_2H_5)_2$$

O,O-diethyl S-(N,N-diethyldithio-carbamoyl) phosphorothiolate i.e. the reaction product of diethoxyoxophosphorane sulphenyl chloride and sodium N:N-diethyldithiocarbamate. Compound (a) has a particularly high acaricidal and fungicidal activity.

Other compounds according to the invention which are of interest include:

O,O di-isopropyl S-(N,N-dimethyldithiocarbamoyl) phosphorothiolate:

$$[(CH_3)_2HCO]_2\overset{O}{\underset{\|}{P}}\!-\!S\!-\!S\!-\!\overset{S}{\underset{\|}{C}}\!-\!N(CH_3)_2$$

O,O-diethyl S-(N,N-diethyldithiocarbamoyl) phosphorothiolate:

$$[(CH_3)_2HCO]_2\overset{O}{\underset{\|}{P}}\!-\!S\!-\!S\!-\!\overset{S}{\underset{\|}{C}}\!-\!N(C_2H_5)_2$$

O,O-di-n-butyl S-(N,N-diemethyldithiocarbamoyl) phosphorothiolate:

$$(C_4H_9O)_2\overset{O}{\underset{\|}{P}}\!-\!S\!-\!S\!-\!\overset{S}{\underset{\|}{C}}\!-\!N(CH_3)_2$$

O,O-di-n-butyl S-(N,N-diethyldithiocarbamoyl) phosphorothiolate:

$$(C_4H_9O)_2\overset{O}{\underset{\|}{P}}\!-\!S\!-\!S\!-\!\overset{S}{\underset{\|}{C}}\!-\!N(C_2H_5)_2$$

O,O-diethyl S-(ethoxydithiocarbonyl) phosphorothiolate:

$$(C_2H_5O)_2\overset{O}{\underset{\|}{P}}\!-\!S\!-\!S\!-\!\overset{S}{\underset{\|}{C}}\!-\!OC_2H_5$$

O,O-diethyl S-(thioethyl) phosphorothiolate:

$$(C_2H_5O)_2\overset{O}{\underset{\|}{P}}\!-\!S\!-\!S\!-\!C_2H_5$$

O,O-diethyl S-(thiophenyl) phosphorothiolate:

$$(C_2H_5O)_2\overset{O}{\underset{\|}{P}}\!-\!S\!-\!S\!-\!C_6H_5$$

O,O-diethyl S-(2-mercaptofurfuryl) phosphorothiolate:

$$(C_2H_5O)_2\overset{O}{\underset{\|}{P}}\!-\!S\!-\!S\!-\!CH_2\!\cdot\!\underset{O}{\underbrace{CH\!-\!CH}_{\phantom{O}}}\!CH$$

O,O-diethyl S-(β-thioethyl-thioethyl) phosphorothiolate:

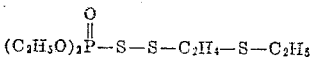

O,O-diethyl S-(p-tolylsulphonyl) phosphorothiolate:

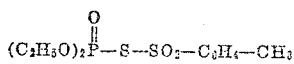

The new compounds according to the invention may be prepared in any desired way. A particularly advantageous method is to condense a compound having the general formula:

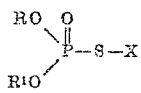     II (where R and R¹ have the meanings defined above and X is chlorine, bromine or iodine but preferably chlorine) with a compound of the general formula:

$$M-Z-R^2 \quad \text{III}$$

(where R² and Z have the meanings defined above and M is hydrogen or an alkali metal or ammonium), if desired in solution or suspension in the presence of a solvent. The reaction is preferably carried out at room temperature in the absence of applied heat. If the reaction is slow the reactants may be heated but care should be exercised to avoid overheating otherwise unwanted side-reactions may occur.

Where M is hydrogen an acid binding agent may be used if desired.

Suitable solvents are benzene, petroleum ether, etc.

It should be noted that under the action of heat or on standing the compounds according to the invention may be converted from the

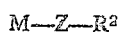

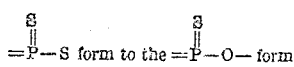 form

The new compounds according to the invention may be formulated for use in any desired way. Generally such formulations will include the insecticidal compound or toxicant in association with a suitable carrier or diluent. Such carriers may be liquid or solid and designed to aid the application of the toxicant either by way of dispersing it where it is to be applied or to provide a formulation which can be made by the user into a dispersible preparation.

Liquid preparations thus include preparations of the toxicant in the form of solutions or emulsions which can be used on their own or be adapted to be made up with water or other diluents to form sprays etc.; in such cases the carrier is a solvent and/or emulsion base nonphytotoxic under the conditions of use. Generally such preparations will include a wetting, dispersing or emulsifying agent. Other liquid preparations include aerosols in which the toxicant is associated with a liquid carrier or propellant.

Solid preparations include dusts and wettable powders, granulates and pellets, and semi-solid preparations such as pastes. Such preparations may include solid or liquid diluents such as clays, which may themselves have wetting properties, and/or wetting, dispersing or emulsifying agents; binding and/or adhesive agents may also be included. Solid preparations also include thermal fumigating devices wherein the toxicant is associated with a solid pyrotechnic component.

The compounds according to the invention may be used, if desired, in admixture with compatible insecticides and/or fungicides.

For the better understanding of the invention the following examples are given by way of illustration only. In these examples temperatures are given in degrees centigrade, unless otherwise stated, and parts unless otherwise stated are by weight. Where parts by weight and parts by volume are mentioned together these are to be taken as having the relationship of grams to ccs.

*Example 1*

A solution of 81.8 g. of diethoxyoxophosphorane sulphenyl chloride in 250 cc. of benzene was added over a period of 10 minutes to a stirred, ice-cooled suspension of 75.2 g. of sodium dimethyl dithiocarbamate (2½ H₂O) in 300 cc. of benzene. The temperature rose to 30° C. After stirring for 1 hour and standing overnight, the mixture was washed with water, then with a saturated aqueous solution of sodium bicarbonate, and again with water. The aqueous washings were extracted with benzene, and the extract was combined with the original benzene solution and dried over anhydrous sodium sulphate. After filtration from sodium sulphate, the benzene was stripped off at a temperature of 60° C. and a pressure of 40 mm. The resulting product consisted of a mixture of an oil and solid in approximately equal proportions. The mixture weighed 113.6 g. Found: N, 4.2; P, 13.2%. O,O-diethyl S-(N,N-dimethyldithiocarbamoyl) phosphorothiolate, $C_7H_{16}NO_3PS_3$, requires N, 4.8 P, 10.7%. The product is a very active pesticide and has a favourable mammalian toxicity.

The oral LD50 of this compound was 110 mg./kg. to mice.

The compound showed remarkable fungicidal activity against the spores of *Venturia inaequalis* and *Cercospora melonis*. The LD95 values of this compound were 7 parts per million against Venturia and 40 parts per million against Cercospora. (LD95 value is the concentration of the toxicant which inhibits 95% of the spores from germination; the test used was that described by Montgomery and Moore, J. Pomol., 1938, 15, 253.)

The product of this example was formulated as follows:

(a) 7 parts of Calflo E (a highly absorbent finely divided inert inorganic carrier) were added to 25 parts of the above toxicant with stirring. To the mixture were added 58 parts of very finely divided kaolin and 10 parts of sulphite lye powder. The whole mixture was then ground to a fine powder, which passed through a sieve containing 300 meshes to the inch, yielding a 25% wettable powder possessing good suspension properties in water.

This wettable powder was diluted with water to contain 0.0025% of the toxicant. Dwarf bean plants infested with Greenhouse Red Spider, which were resistant to high concentrations (0.05%) of a number of organophosphorus insecticides such as schradan (octamethylpyrophosphoramide) and parathion (O,O-diethyl O-p-nitrophenyl phosphorothioate), were dipped in this mixture and observations were made after 48 hours, when it was found that all the spiders on the plants were killed.

The 25% wettable powder was diluted with water to contain 0.1% of the toxicant. Apple rootstocks were sprayed with the above mixture to run-off. The deposit was allowed to dry for 4–5 hours. The treated rootstocks were then transferred to an infection chamber, sprayed with a suspension of spores of *Venturia inaequalis* and kept at 60–65° F. for 48 hours. The rootstocks were then removed from the infection chamber and an assessment of the infection carried out 21 days later. Almost complete protection from apple scab was achieved.

Cucumber plants were also sprayed to run-off with the 25% wettable powder diluted with water to contain 0.1% of the toxicant. The deposit was allowed to dry and the plants were lightly dusted with spores of cucumber mildew (*Erysiphe cichoracearum*). Treatments with the toxicant were repeated at weekly intervals and weekly assessments of the infection were carried out. It was found that complete protection against the infection was obtained on the treated plants.

Both in the apple scab tests and cucumber mildew tests suitable controls were used.

(b) The product of this example was also formulated as a 2% dust as follows: 2 parts of the product were intimately mixed with 73 parts of a finely divided china clay, and to the mixture were added 25 parts of a previously prepared mixture consisting of 80 parts of the finely divided china clay and 20 parts of paraffin wax. Dwarf bean plants infested with Greenhouse Red Spider resistant to schradan and parathion were dusted with this 2% dust at the rate of 28 lbs. per acre. Observations made after 48 hours showed all the spiders to be dead.

The 2% dust was also used in tests on hops in Germany for the control of red spider mites. This spider was found before to be resistant to the well known and widely used insecticides "Systox" [a mixture of O,O-diethyl O-2-(ethylthio)-ethyl phosphorothionate and the S-2-ethylthioethyl isomer] and "Metasystox" [a mixture of O,O-dimethyl O-2-(ethylthio)-ethyl phosphorothionate and the S-2-ethylthioethyl isomer]. The hops were dusted with the 2% dust. Complete kills were obtained after 24 hours of the nymphs, adults and overwintering females. The kills obtained in parallel tests with "Systox" and "Metasystox" were poor.

(c) 10 parts by weight of the compound of this example and 15 parts by weight of "Lissapol" NX (a polyethylene glycol ether) were made up to 100 parts by volume with acetone. This solution was diluted with water to contain 0.001% of the toxicant. Dwarf bean plants infested with Greenhouse Red Spider were dipped in this mixture and observations were made after 48 hours, when it was found that all the spiders on the plants were killed. A dilution containing 0.01% of the toxicant gave a complete kill of aphids on broad beans in a parallel test.

*Example 2*

A solution of 40.9 g. of diethoxyoxophosphorane sulphenyl chloride in 20 cc. of benzene was added over a period of 8 minutes to a stirred, ice-cooled suspension of 45 g. of sodium diethyl dithiocarbamate ($3H_2O$) in 200 cc. of benzene. The temperature rose to 20° C. After stirring for 3.5 hours and allowing the mixture to stand overnight, it was worked up as in Example 1. The product, O,O-diethyl S-(N,N-diethyldithiocarbamoyl) phosphorothiolate, a red-brown mobile oil, weighed 63 g.

This product was formulated as follows:

20 parts by weight of the toxicant and 30 parts by weight of Lissapol NX were made up to 100 parts by volume with methanol. The solution was diluted with water to contain 0.0001% of the toxicant. Dwarf beans infested with Greenhouse Red Spider were dipped in this mixture and observations were made after 48 hours, when it was found that all the spiders on the plants were killed.

A dilution of 0.001% also gave a complete kill of aphids on broad beans in a parallel test.

The LD95 of this compound against *Venturia inaequalis* was 58 parts per million.

*Example 3*

A solution of 70 g. of diisopropoxyoxophosphorane sulphenyl chloride in 50 cc. of benzene was added to an ice-cooled suspension of 5.6 g. of sodium dimethyl dithiocarbamate ($2½H_2O$) in 250 cc. of benzene. The temperature rose to 35° C. After stirring for 30 minutes and allowing the mixture to stand overnight, it was worked up as in Example 1. The product, O,O-di-isopropyl S-(N,N-dimethyldithiocarbamoyl) phosphorothiolate, was obtained as a yellow mixture of solid and oil weighing 95 g.

This product was formulated as follows: 20 parts of the toxicant were mixed with 30 parts of Lissapol NX and made up to 100 parts of volume with methanol. A solution was made up with water to contain 0.005% of the toxicant and broad beans infested with aphids were dipped in it. Observations were made after 48 hours when it was found that 99% of the aphids on the plants were dead.

In a parallel test a 99% kill of Greenhouse Red Spider was obtained on dwarf bean plants.

The product of this example was also formulated as a 25% wettable powder following the procedure of Example 1. It gave a 98% control of apple scab on apple rootstocks by the test described in Example 1.

*Example 4*

A solution of 93 g. of diisopropoxyoxophosphorane sulphenyl chloride in 80 c.c. of benzene was added to a suspension of 90 g of sodium diethyl dithiocarbamate ($3H_2O$) in 200 c.c. of benzene at 30–35° C. and the mixture was worked up as in Example 3. A red oil was obtained weighting 129 g. (Found: N, 3.5; P, 9.6%. O,O-di-isopropyl S-(N,N-diethyldithiocarbamoyl) phosphorothiolate $C_{11}H_{24}NO_3PS_3$ requires N, 4.1% P, 9.0%).

This product was formulated as a 25% wettable powder as in Example 1. When tested at a concentration of 0.1% of toxicant for protection against *Venturia inaequalis* on apple rootstocks by the technique described in Example 1 it gave 98.5% control of the infection. In the same test captan (N-trichloromethylmercapto-4-cyclohexene-1,2-dicarboximide) at 0.1% concentration gave a control of the infection of 97.5%.

In a test for control of powdery mildew on cucumbers almost complete protection was achieved with a 25% wettable powder prepared and tested by the techniques described in Example 1.

The oil was also formulated as a 2% dust as in Example 1. The dust was placed in a dish in a chamber in which cucumber plants were present. The dust was blown by compressed air and allowed to settle on the surface of the leaves during 15 minutes. The plants were then infected with spores of cucumber mildew (*Erysiphe cichoracearum*), the infection assessed after a week and dusted again with the toxicant dust, then another assessment was carried out after 1 week. Almost complete protection from infection with cucumber mildew was obtained on the treated plants whereas control plants became progressively more infected.

This product also gave a control of *Botrytis fabae* on broad beans superior to that of zineb (zinc ethylene bisdithiocarbamate).

*Example 5*

A solution of 117.2 g. of di-n-butoxyoxophosphorane sulphenyl chloride in 60 c.c. of benzene was added over a period of 9 minutes to a suspension of 84.6 g. of sodium dimethyl dithiocarbamate ($2½H_2O$) in 300 c.c. of benzene, at 25–35° C. After the addition, the mixture was stirred for 20 minutes and allowed to stand overnight. It was then treated as in Example 1. The product, O,O-di-n-butyl S-(N,N-dimethyldithiocarbamoyl) phosphorothiolate, was a mixture of a dark brown oil and solid and weighed 127.5 g.

The product was formulated as a 25% wettable powder as in Example 1. When tested at a concentration of 0.1% of toxicant for protection against *Venturia inaequalis* on apple rootstocks by the technique described in Example 1 it gave 99% control of the infection (in the same test captan at a concentration of 0.1% of toxicant gave a control of 98%).

*Example 6*

To a suspension of 90 g. of sodium diethyl dithiocarbamate ($3H_2O$) in 300 c.c. of benzene was added a solution of 104.2 g. of di-n-butoxyoxophosphorane sulphenyl chloride in 60 c.c. of benzene over a period of 8 minutes at 25–35° C. After stirring for 20 minutes and standing overnight, the mixture was worked up as in Example 5 to yield 100.8 g. of a dark viscous oil. O,O-di-n-butyl S-(N,N-diethyldithiocarbamoyl) phosphorothiolate.

In a test for powdery mildew on cucumbers, complete protection was achieved with a 2% dust prepared according to Example 1 and tested by the technique described in Example 4.

*Example 7*

To a suspension of potassium xanthate (16 g.) in 100 c.c. of benzene was added a solution of diethoxyoxophosphorane sulphenyl chloride (20.4 g.) in 25 c.c. of benzene, while stirring and cooling with water. The temperature during the addition was 13–18°. The reaction mixture was set aside overnight at room temperature and then washed successively with water, a saturated aqueous solution of sodium bicarbonate and again with water. The aqueous washings were extracted with more benzene and the combined benzene extracts were dried over anhydrous sodium sulphate, filtered and the benzene was then stripped off at 60° and 40 mm. pressure. O,O-diethyl S-(ethoxydithiocarbonyl) phosphorothiolate was obtained as a dark brown, mobile oil weighing 16.2 g.

The product was formulated as in Example 2 and the resulting solution was diluted with water to contain 0.0005% of the toxicant. Dwarf beans infested with Greenhouse Red Spider were dipped in this mixture and observations were made after 48 hours, when it was found that all the spiders on the plants were killed.

A dilution containing 0.01% of the toxicant gave a complete kill of aphids on broad beans in a parallel test.

*Example 8*

Ethyl mercaptan (3.1 g.) was dissolved in 50 cc. of benzene and to it was added a solution of diethoxyoxophosphorane sulphenyl chloride (10.2 g.) in 15 cc. of benzene, while cooling and stirring. The temperature of the reaction mixture was kept at 9–10°. Hydrogen chloride gas evolved slowly. It was then set aside at room temperature for 16 hours, then kept for half-an-hour at 70° and treated as in Example 7. O,O-diethyl S-(thioethyl)phosphorothiolate was obtained as a dark, mobile oil weighing 5.2 g.

This product was formulated as in Example 2. The resulting solution was diluted with water to contain 0.001% of the toxicant. Dwarf beans infested with Greenhouse Red Spider were dipped in this mixture and observations were made after 48 hours, when it was found that 98% of the spiders on the plants were killed.

*Example 9*

Diethoxyoxophosphorane sulphenyl chloride (20.4 g.) dissolved in 25 cc. of benzene was added gradually, during 5 minutes, to a solution of thiophenol (11 g.) in 50 cc. of benzene, with external water cooling and stirring. The temperature of the reaction mixture lay between 12 and 28°. Hydrogen chloride evolved rapidly. The reaction mixture was allowed to stand overnight and then treated as in Example 7. O,O-diethyl S-(thiophenyl) phosphorothiolate was obtained as a deep orange-red oil weighing 18.7 g.

The compound was formulated as in Example 2 and then diluted with water to contain 0.001% of the toxicant. Dwarf beans infested with Greenhouse Red Spider were dipped in this mixture and observations made after 48 hours when it was found that 95% of the spiders had been killed.

*Example 10*

Diethoxyoxophosphorane sulphenyl chloride (20.4 g.) in 25 cc. of benzene was added gradually to a suspension of sodium 2-furfuryl mercaptide (13.6 g.) in 50 cc. of benzene, with stirring and cooling. The temperature of the reaction mixture lay between 10 and 41°. It was allow to stand overnight and worked up as in Example 7. O,O-diethyl S-(2-mercaptofuryl) phosphorothiolate was obtained as a dark brown, mobile oil weighing 16.9 g.

The compound was formulated as in Example 2 and then diluted with water to contain 0.001% of the toxicant. Dwarf beans infested with Greenhouse Red Spider were dipped in this mixture and observations made after 48 hours when it was found that all the spiders had been killed.

*Example 11*

A solution of 3.7 g. of diethoxyoxophosphorane sulphenyl chloride in 5 cc. of benzene was added, with cooling, to a solution of 1.4 g. of β-mercapto-diethyl sulphide in 15 cc. of benzene. The temperature rose from 5° to 28° C. and hydrogen chloride was rapidly evolved. The reaction mixture was then heated for 18 hours at 60–65° C. and worked up as in Example 1. The product, O,O-diethyl S-(β-thioethyl-thioethyl) phosphorothiolate, a red-brown mobile oil, weighed 3.3 g.

*Example 12*

A solution of 20.5 g. of diethoxyoxophosphorane sulphenyl chloride in 20 cc. of benzene was added during 10 minutes to a suspension of 17.8 g. of sodium p-toluene sulphinate in 50 cc. of benzene while stirring and cooling. The mixture was stirred for 30 minutes and then left overnight. It was washed with water, then with a saturated aqueous solution of sodium bicarbonate and again with water. The washings were extracted with benzene, the benzene washings combined with the original benzene solution and dried over anhydrous sodium sulphate. After filtration of the sodium sulphate, the benzene was stripped off at a temperature of 50° C. and pressure of 20 mm. Hg. The residual dark brown oil, O,O-diethyl S-(p-tolylsulphonyl) phosphorothiolate, weighed 28 g.

The product was formulated as follows: 10 parts by weight of the toxicant were mixed with 15 parts by weight of Lissapol NX and made up to 100 parts by volume with acetone. This solution was diluted with water to contain 0.001% of the toxicant. Dwarf bean plants infested with Greenhouse Red Spider were dipped in this mixture and observations were carried out after 48 hours when it was found that all the spiders on the plants were dead.

In a parallel test a dilution of 0.01% gave a complete kill of aphids on broad beans.

I claim:

1. As new compounds, compounds of the general formula:

$$\begin{array}{c} RO \quad O \\ \diagdown \, \| \\ P-S-Z-R^2 \\ \diagup \\ R^1O \end{array}$$

in which Z is selected from the group consisting of sulphur and $-SO_2-$ groups;

R and $R^1$ are alkyl groups containing 1–4 carbon atoms and $R^2$ is selected from the group consisting of:

(i) substituted thiocarbamoyl groups $$\begin{array}{c} S \quad R^3 \\ \| \quad \diagup \\ -C-N \\ \diagdown \\ R^4 \end{array}$$

in which $R^3$ is selected from the group consisting of hydrogen and alkyl groups and $R^4$ is an alkyl group;

(ii) alkoxythiocarbonyl groups $$\begin{array}{c} S \\ \| \\ -C-OR^5 \end{array}$$

where $R^5$ is an alkyl group;

(iii) a member selected from the group consisting of alkylthioalkyl and furfuryl groups; and (iv) where $Z=-SO_2-$, a halogenophenyl group.

2. Compounds as defined in claim 1 in which the groups $R_3$ and $R_4$ contain from 1–12 carbon atoms.

3. Compounds as claimed in claim 1 in which the groups $R_3$ and $R_4$ are selected from the group consisting of methyl and ethyl groups.

4. O,O-diethyl S-(N,N-dimethyldithiocarbamoyl) phosphorothiolate:

$$(C_2H_5O)_2\overset{O}{\overset{\|}{P}}-S-\overset{S}{\overset{\|}{C}}-N(CH_3)_2$$

5. O,O-diethyl S-(N,N-diethyldithiocarbamoyl) phosphorothiolate:

$$(C_2H_5O)_2\overset{O}{\underset{\|}{P}}-S-S-\overset{S}{\underset{\|}{C}}-N(C_2H_5)_2$$

6. O,O-di-isopropyl S-(N,N-dimethyldithiocarbamoyl) phosphorothiolate:

$$[(CH_3)_2HCO]_2\overset{O}{\underset{\|}{P}}-S-S-\overset{S}{\underset{\|}{C}}-N(CH_3)_2$$

7. O,O-di-isopropyl S-(N,N-diethyldithiocarbamoyl) phosphorothiolate:

$$[(CH_3)_2HCO]_2\overset{O}{\underset{\|}{P}}-S-S-\overset{S}{\underset{\|}{C}}-N(C_2H_5)_2$$

8. O,O-di-n-butyl S-(N,N-dimethyldithiocarbamoyl) phosphorothiolate:

$$(C_4H_9O)_2\overset{O}{\underset{\|}{P}}-S-S-\overset{S}{\underset{\|}{C}}-N(CH_3)_2$$

9. O,O-di-n-butyl S-(N,N-diethyldithiocarbamoyl) phosphorothiolate:

$$(C_4H_9O)_2\overset{O}{\underset{\|}{P}}-S-S-\overset{S}{\underset{\|}{C}}-N(C_2H_5)_2$$

10. O,O-diethyl S-(ethoxydithiocarbonyl) phosphorothiolate:

$$(C_2H_5O)_2\overset{O}{\underset{\|}{P}}-S-S-\overset{S}{\underset{\|}{C}}-OC_2H_5$$

11. O,O-diethyl S-(2-mercaptofurfuryl) phosphorothiolate:

$$(C_2H_5O)_2\overset{O}{\underset{\|}{P}}-S-S-CH_2\cdot\underset{\underset{O}{\diagdown\diagup}}{\overset{CH-CH}{\underset{\|}{C}\phantom{--}\underset{\|}{CH}}}$$

12. O,O-diethyl S-(β-thioethyl-thioethyl) phosphorothiolate:

$$(C_2H_5O)_2\overset{O}{\underset{\|}{P}}-S-S-C_2H_4-S-C_2H_5$$

13. A pesticidal composition comprising in association with a carrier at least one compound of the general formula:

$$\underset{R^1O}{\overset{RO}{\diagdown}}\underset{\diagup}{\overset{\overset{O}{\|}}{P}}-S-Z-R^2$$

in which Z is selected from the group consisting of sulphur and —SO₂— groups;

R and R¹ are alkyl groups containing 1–4 carbon atoms and

R² is selected from the group consisting of:
 (i) substituted thiocarbamoyl groups $$-\overset{S}{\underset{\|}{C}}-N\underset{R^4}{\overset{R^3}{\diagdown}}$$

in which R³ is selected from the group consisting of hydrogen and alkyl groups and R⁴ is an alkyl group;
 (ii) alkoxythiocarbonyl groups $$-\overset{S}{\underset{\|}{C}}-OR^5$$

where R⁵ is an alkyl group;
 (iii) alkyl groups, alkylthioalkyl groups and furfuryl, and,
 (iv) where Z=—SO₂—, phenyl, alkylphenyl and halogenophenyl groups.

14. A composition as defined in claim 13 in which the groups R³ and R⁴ contain from 1–12 carbon atoms.

15. A composition as claimed in claim 13 in which the groups R³ and R⁴ are selected from the group consisting of methyl and methyl groups.

16. A composition as defined in claim 13 in which R³ is an alkyl group containing 1–12 carbon atoms.

17. A composition as defined in claim 16 in which R³ contains 1–4 carbon atoms.

18. A process for the preparation of compounds of the general formula:

$$\underset{R^1O}{\overset{RO}{\diagdown}}\underset{\diagup}{\overset{\overset{O}{\|}}{P}}-S-Z-R^2$$

in which Z is selected from the group consisting of sulphur and —SO₂— groups;

R and R¹ are alkyl groups containing 1–4 carbon atoms and

R² is selected from the group consisting of:
 (i) substituted thiocarbamoyl groups $$-\overset{S}{\underset{\|}{C}}-N\underset{R^4}{\overset{R^3}{\diagdown}}$$

in which R³ is selected from the group consisting of hydrogen and alkyl groups and R⁴ is an alkyl group;
 (ii) alkoxythiocarbonyl groups $$-\overset{S}{\underset{\|}{C}}-OR^5$$

where R⁵ is an alkyl group;
 (iii) a member selected from the group consisting of alkylthioalkyl and furfuryl groups; and
 (iv) where Z=—SO₂—, phenyl, alkylphenyl and halogenophenyl groups, which process comprises condensing a compound of the general formula:

$$\underset{R^1O}{\overset{RO}{\diagdown}}\underset{\diagup}{\overset{\overset{O}{\|}}{P}}-S-X$$

where R and R¹ have the meanings set forth above and X is selected from the group consisting of chlorine, bromine and iodine with a compound of the general formula:

$$M-Z-R^2$$

where Z and R² have the meanings set forth above and M is selected from the group consisting of hydrogen, alkali metals and ammonium.

References Cited in the file of this patent

UNITED STATES PATENTS

| | | |
|---|---|---|
| 2,585,813 | McDermott | Feb. 12, 1952 |
| 2,648,696 | Whetstone | Aug. 11, 1953 |
| 2,818,364 | Birum | Dec. 31, 1957 |
| 2,828,241 | Birum | Mar. 25, 1958 |
| 2,891,059 | Malz et al. | June 16, 1959 |

OTHER REFERENCES

Kabachnik et al.: "Chem. Abst.," 50, 8499, (1956).
Van Wazer: "J. Am. Chem. Soc.," 78, 5724 (1956).
Truchlik et al.: "Chem. Zvesti," 11, 24–29 (1957).